United States Patent [19]
Carlson

[11] Patent Number: 5,885,126
[45] Date of Patent: Mar. 23, 1999

[54] ADJUSTABLE VOLUME WATERFOWL CALL

[76] Inventor: Wendell R. Carlson, 12200 College St., R.R. #2, Cedar Rapids, Iowa 52404

[21] Appl. No.: 705,130

[22] Filed: Aug. 29, 1996

Related U.S. Application Data

[63] Continuation of Ser. No. 643,783, Jan. 18, 1991, which is a continuation-in-part of Ser. No. 459,980, Jan. 2, 1990, abandoned.

[51] Int. Cl.$^6$ ..................................................... A63H 5/00
[52] U.S. Cl. ............................................................ 446/208
[58] Field of Search ................................... 446/207, 208; 84/400

[56] References Cited

U.S. PATENT DOCUMENTS 2,598,268  5/1952  Kendrick .................................. 446/207
3,760,679  9/1973  Gossick et al. ............................ 84/400
4,915,660  4/1990  Overholt, Sr. ........................... 446/207

Primary Examiner—Robert A. Hafer
Assistant Examiner—Jeffrey D. Carlson
Attorney, Agent, or Firm—James C. Nemmers

[57] ABSTRACT

An improved call for use in calling waterfowl or game in which the call has a unique set of interchangeable chokes so that the volume of the call can be easily varied by the user. The precisely designed chokes provide the user the ability of changing the volume by replacing the choke so as to better fit the particular conditions of the environment without changing the reed size or thickness. The call also contains an opening in the side of the barrel which opening is normally closed by a plug which can be removed to allow the user to simulate different calls.

5 Claims, 2 Drawing Sheets

ADJUSTABLE VOLUME WATERFOWL CALL

This application is a continuation of application Ser. No. 07/643,783 filed Jan. 18, 1991, which is a continuation-in-part of application Ser. No. 07/459,980 filed Jan 2, 1990 abandoned.

THE BACKGROUND OF THE INVENTION

The invention relates to a call for use in calling waterfowl or game. These calls commonly have a barrel one end of which provides a mouth piece into which the user blows. Extending from the opposite end of the barrel is an insert which contains a reed that vibrates in the sound chamber, provided by the barrel, and a bore that controls the air escape rate thereby producing the desired sound to call ducks or geese, for example. In calls of this type, the volume or loudness of the sound produced by the call is dependent upon a number of factors. These include the amount of air pressure applied by the user, the forward flow rate of the air through the call and the escape rate of the air from the bore. Also important in the loudness of the call are the internal dimensions of the sound chamber which affect the amount of internal displacement of the air. The prior art discloses means for varying the tone of the call, and one example of such a call is shown in Bicocchi U.S. Pat. No. 2,556,388. However, it is desirable for the ordinary user who may not be skilled in using calls to be able to greatly vary the volume of the call depending upon the acoustical environment and conditions in which the call is being used. This capability is important whether the call is used in the field or in competitive tournament calling. Without changing from one call to another, there is no known way of easily varying the loudness of a call significantly. Because high quality calls are not inexpensive there is therefore a need for a way in which a single call can be used to produce the desired variation in volume which is very important to the effectiveness of calls used both in the field and in tournament calling.

Also, there are times when the user may wish to create the sounds associated with calling the Mallard and similar type ducks but be able to quickly switch to simulating the call given by the whistling type ducks, such as the Wood Duck. This can be accomplished, of course, by changing from one call to another, but there is no known way of quickly and easily changing between these two quite different calls using a single call.

There is therefore a need for a relatively inexpensive call, the loudness of which can be quickly and easily varied by the user depending upon the acoustical environment and conditions in which the call is being used. There is also a need for a single call which can be used to produce sounds associated with calling different types of waterfowl, such as the whistling type duck.

SUMMARY OF THE INVENTION

The call of the invention is provided with interchangeable chokes each of which has a different size air passageway that changes the design of the insert bore and the escape rate of the air blown into the call by the user, thereby varying the frequency and volume of the sound produced. The easily removable and interchangeable chokes are retained in the end of the insert, preferably by threading them in or by other suitable means, such as a turn-lock arrangement or use of a locking pin. In order to provide the call with a capability of creating different sounds associated with calling different types of ducks, the barrel is provided with an optional opening normally closed by a plug. By removing the plug and with proper instruction, the user can produce an unusually realistic whistling duck call sound.

DESCRIPTION OF THE PREFERRED EMBODIMENTS OF THE INVENTION

Figure 1:
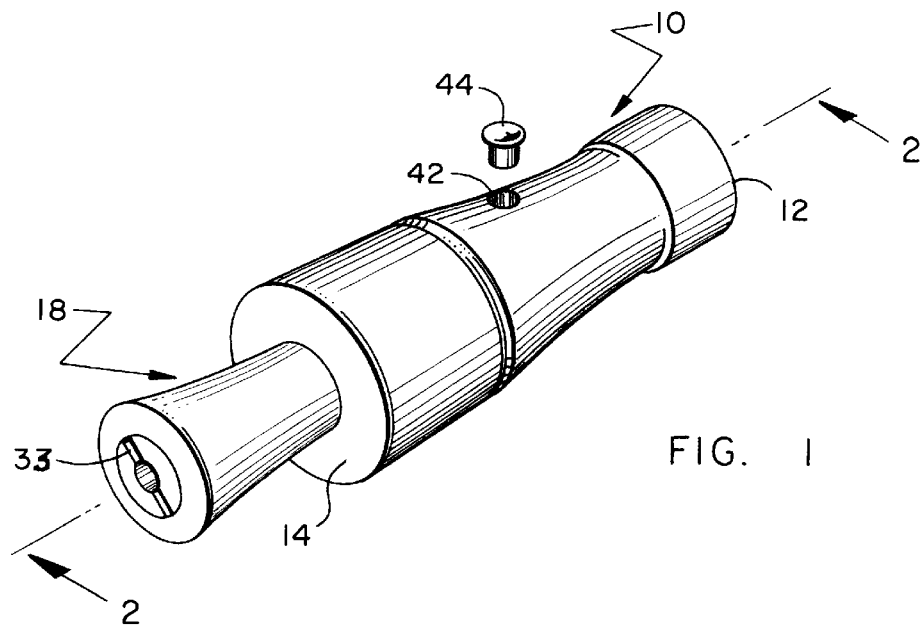
FIG. 1 is a perspective view of a call constructed according to the principles of the invention.
Figure 2:
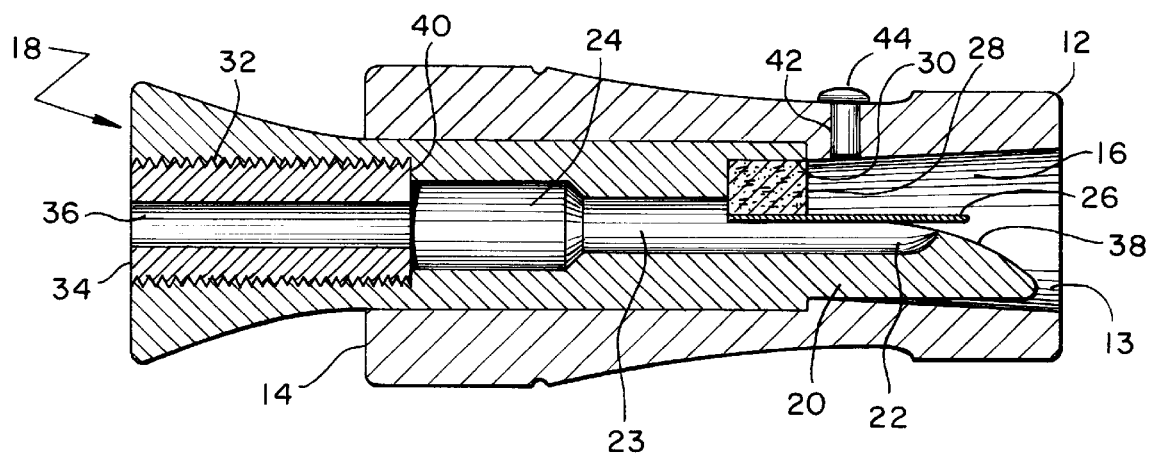
FIG. 2 is a sectional view of the call of the invention taken on the line 2—2 of FIG. 1 to show the internal construction.
Figure 3:
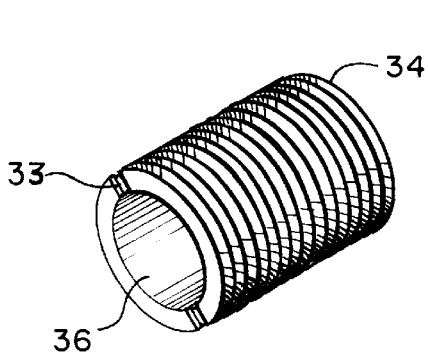
FIG. 3 is a perspective view of a typical one of the removable chokes.
Figure 4:
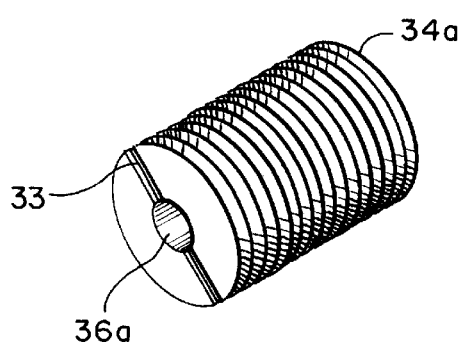
FIG. 4 is a perspective of a different type of various chokes for use in the call of the invention.

The call of the invention is a manually operated air-powered type call. Calls of this type include a barrel 10 which has a mouthpiece 12 and an outer end 14 between which are formed a sound chamber 16. As shown in FIG. 2, the mouthpiece 12 has an opening 13 into which the user blows in order to provide air pressure and flow through the sound chamber 16 and the additional chambers described hereinafter that create the desired sound effect. The outer end 14 has an opening into which there is placed the insert, indicated generally by the reference numeral 18. The insert 18 has a longitudinally extending member 20 with a centrally located and longitudinally extending bore 22 which forms the insert, sound chamber 23 that terminates in a transitional sound channel 24. The combination of the insert sound chamber 23, transitional sound channel 24, air passageway 36 in choke 34 and the barrel sound chamber 16 form the resonant cavity of the call. A reed 26 is supported by the member 20 and extends over the bore 22, the reed 26 being held in place by a suitable retainer 28 that is fitted in a retainer slot 30. At the outer end of the insert 18 there is formed a choke accepter bore 32 which is shown as being a threaded bore with an internal shoulder 40 formed at the juncture with sound channel 24. Threadedly received in the bore 32 is a removable choke 34, which has a slot 33 formed in its outer end to facilitate insertion and removal. The choke 34 shown in FIG. 3 has an air passageway 36 of relatively large diameter. A similar choke 34a is shown in FIG. 4 as having an air passageway 36a of relatively small diameter. If desired, transitional sound channel 24 may be formed as a part of the choke 34 or choke 34a.

Figure 5:
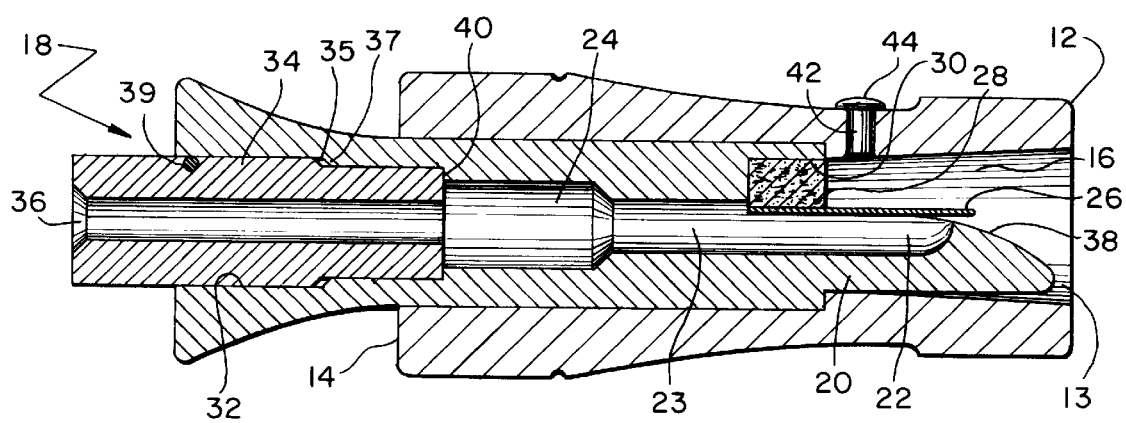
FIG. 5 is a sectional view similar to FIG. 2 but showing another way of retaining the removable chokes in the barrel.

FIG. 5 illustrates another method of retaining the choke 34 or choke 34a in place in the insert member 18. Rather than threading the bore 32 and the outer surface of the choke 34, the choke has a smooth outer surface and is provided with a shoulder 35 that engages a corresponding shoulder 37 in the bore 32 to aid in positioning the choke. This allows the choke 35 to be slid into the bore 32 until the shoulders 35 and 37 are engaged. A retaining pin 39 is then inserted through the outer end of the insert 18, which pin 39 extends only through the wall of the choke 34 but does not pass through the bore 36 in the choke. Also, the choke 34 preferable extends beyond the end of insert 18 to provide the user with a surface to grip for the purpose of easily removing the choke from the bore 32. As a further alternative, O-rings (not shown) fitted into corresponding grooves in the outer surface of the choke 34 and in the bore 32 could be used to retain the choke in place.

The reed 26, the retainer 28, the insert 18 and the barrel 10 as well as the interchangeable chokes 34 may be fabricated from a variety of materials, such as plastic, wood, rubber, cork, metal or other materials which provide the proper acoustical relationships, composite sound output and practical durability. For example, the barrel 10 and insert 18 in a call may be constructed of wood with the reed retainer 28 made of a cork/rubber compound.

The end of the longitudinally extending member 20 of the insert 18 is tapered and rounded as indicated in the drawings so as to provide an air ramp 38 beneath the reed 26 and leading into the bore 22. This air ramp 38 and bore 22 provide the sounding surface of the call. In this specific configuration, all dimensions must relate to the length of the reed 26 and its width, stiffness, thickness and other factors so as to provide proper modulation of the air flowing through the call. As with any wind instrument, the frequency range, volume, overtone characteristics and other tonal qualities are a function of all of the dimensions and design of the instrument itself. While every aspect of the design affects its function, the principal components that result in a particular characteristic sound are the reed 26 and its relationship to the sounding surface and design that are provided by the air ramp 38 in combination with the barrel sound chamber 16, the insert sound chamber 23, the sound channel 24 and air passageway 36 in choke 34. These design characteristics determine the forward air flow rate through the call, and this air flow rate is a function of the various internal dimensions of the insert 18 and the components that provide the surfaces along which the air flows through the call. The beneficial and unique results of using the interchangeable chokes 34 result from the changes in the forward flow rate and the resonant cavity dimensions that occur as a result of changing the chokes 34. Of course, the beneficial results of the interchangeable insert choke 34 are also produced by taking into account all of the design considerations in the call itself, and also, as with any functional wind instrument, proper operational technique is required on the part of the user.

As previously indicated, different chokes, such as the illustrated chokes 34 and 34a, have air passageways (passageways 36 or 36a) of different diameters, and by changing from one choke to another, the air escape rate from the call is varied depending upon the size and design of the air passageway in the choke. The air escape rate from the call is directly related to the volume or loudness of the sound produced by the call. Also, the tonal characteristics of the call are changed whenever a different choke 34 is threaded into the insert 18. A skillful call user will be able to derive a considerable range of tonal qualities and "duckyness", which is the low frequency component included in the total sound output. This range of tonal qualities and "duckyness" is provided by the call of the invention regardless of the particular choke 34 then in use. By providing interchangeable chokes 34, the call user can produce a greater low frequency component in the total sound output by slightly loosening the choke 34 from its tightly seated position against the shoulder 40 formed between the bore 32 and the bore 24. By loosening the choke 34 in this manner, a slight increase will be produced in the air turbulence in the sound chamber resulting in the ability to adjust and control the low frequency component of the composite sound output, thereby producing more or less "duckyness". Thus, the removable and interchangeable chokes 34 not only permit a single call to be quickly and easily varied in its loudness, but the adjustability of the removable chokes 34 allows the skillful user to also vary the tonal qualities of the call.

In addition to the ability of the call of the invention to have its loudness and tonal characteristics varied by proper selection and use of different chokes 34, I also prefer to provide the call, as required, with an opening 42 in the side of the barrel 10, which opening 42 is normally closed by plug 44. Thus, this opening 42 may be opened or closed by the user by either removing or inserting the plug 44. The opening 42 is normally closed when the call is used to create the sound associated with calling the Mallard or similar type ducks. When so used, the call is operated by blowing into the mouthpiece 12. However, should the user wish to simulate the calls given by the whistling type ducks, such as the wood duck, this can be simply accomplished by removing the plug 44 and blowing across the opening 42 in the proper manner while closing off the air passageway 36 or 36a in the choke 34. This is correctly accomplished by the user placing the right thumb over the terminal end of the air passageway 36 or 36a while at the same time placing the left thumb to partly close the opening 13 in the mouthpiece 12. In this manner, some of the air is discharged through opening 13 in the mouthpiece 12 while some of the air is also discharged back out the opening 42. Proper coordination of the left thumb position, the user's tongue location and the angle and quantity of air blown across the opening 42 will produce an unusually realistic whistling duck call sound. This results from the unique design of the resonant cavity which is comprised of the barrel sound chamber 16, the insert sound chamber 23, the transitional sound channel 24 and the air passageway 36 in choke 34.

Obviously, instead of the plug 44, a finger can be used to close off the opening 42, especially if speed is important when changing from calling the Mallard to the whistle duck or vice versa.

Having thus described the invention in connection with a preferred embodiment thereof, it will be evident to those skilled in the art that various revisions and modifications can be made to the preferred embodiment without departing from the spirit and scope of the invention. It is my intention however that all such revisions and modifications that are evident to those skilled in the art will be included in this scope of the following claims.

What is claimed is as follows:

1. A wind instrument for use in calling waterfowl or game and the like comprising a barrel having a mouthpiece and a discharge end connected by a sound chamber inside of the barrel, the barrel having an opening extending from the outside laterally into the sound chamber of the barrel, a removable plug normally closing the opening in the barrel, the mouthpiece having an opening through which the user blows and the discharge end having an opening, an insert member having an outer end and an inner end removably received in the opening in the discharge end of the barrel with the inner end extending into the barrel sound chamber toward the mouthpiece, the insert having a longitudinally extending bore terminating near the outer end of the insert in a sound channel, a reed combined with the insert member at its inner end near the mouthpiece of the barrel and extending over the bore in the insert, and a removable choke received in the outer end of the insert, the choke having a longitudinal bore extending through it to the sound channel.

2. A wind instrument for use in calling waterfowl or game and the like comprising a barrel having a mouthpiece at a first end and a discharge opening at the second end, the discharge opening being connected to the mouthpiece by a sound chamber inside of the barrel, the mouthpiece having an opening through which the user blows air under pressure into the sound chamber and out through the discharge opening, an insert member having an outer end and an inner end removably received in the discharge opening of the barrel with the inner end extending into the sound chamber and toward the mouthpiece, the insert member being fixed relative to the barrel and having a longitudinally extending bore terminating near the outer end of the insert member in a sound channel of a fixed size, a reed combined with the insert member at its inner end near the mouthpiece of the barrel and extending over the bore in the insert, the barrel having an opening extending from the outside laterally into the sound chamber of the barrel, and a removable plug normally closing the opening in the barrel.

3. A wind instrument for use in calling waterfowl or game and the like comprising a barrel having a mouthpiece at a first end and a discharge opening at the second end, the discharge opening being connected to the mouthpiece by a bore inside of the barrel, the mouthpiece having an opening through which the user blows air under pressure into the bore, an insert member having an outer end and an inner end removably received in the discharge opening of the barrel with the inner end extending into the bore and toward the mouthpiece, the insert member being fixed relative to the barrel and having a first longitudinally extending passageway terminating near the outer end of the insert member and a second longitudinally extending passageway of smaller diameter than the first passageway and terminating near the inner end of the insert member, the second passageway and the bore of the barrel near the mouthpiece defining a sound chamber of a fixed size, a reed combined with the insert member at its inner end and extending into the sound chamber near the mouthpiece of the barrel, the first passageway in the insert member defining a transitional sound channel having a discharge opening, and a first removable choke received in the outer end of the insert member so as to extend into the transitional sound channel, the first choke having a longitudinal bore extending through it to the transitional sound channel a second choke being interchangeable with the first choke and said chokes having longitudinal bores of a different size thereby allowing the user to vary the size and discharge opening of the transitional sound channel and thus vary the loudness of the call without varying the pitch.

4. The wind instrument of claim 3 in which each choke is slidable into the outer end of the insert to a selected position, and means is provided for locking the choke in a selected position.

5. The wind instrument of claim 3 in which each choke is threaded into the outer end of the insert to provide for full range adjustability of the choke's position relative to the insert.

\* \* \* \* \*